United States Patent [19]

Sato

[11] Patent Number: 4,661,949
[45] Date of Patent: Apr. 28, 1987

[54] CIRCUIT FOR CONFERENCE TELEPHONY

[75] Inventor: Takane Sato, Ebina, Japan

[73] Assignee: Fuji Xerox Co., Ltd., Tokyo, Japan

[21] Appl. No.: 735,743

[22] Filed: May 20, 1985

[30] Foreign Application Priority Data

Jun. 7, 1984 [JP] Japan .................................. 59-115545

[51] Int. Cl.[4] ...................... H04M 3/00; H04Q 11/04; H04J 3/24
[52] U.S. Cl. ......................................... 370/62; 370/94; 379/202
[58] Field of Search ............................ 370/94, 62, 60; 179/18 BC

[56] References Cited

U.S. PATENT DOCUMENTS

| 4,063,220 | 12/1977 | Metcalfe et al. | 340/147 R |
|---|---|---|---|
| 4,280,216 | 7/1981 | Zeitrag | 370/62 |
| 4,320,501 | 3/1982 | Le Dieu et al. | 370/59 |
| 4,502,137 | 2/1985 | Tan | 370/85 |
| 4,509,166 | 4/1985 | Simon | 370/62 |
| 4,545,050 | 10/1985 | van Baaroewijk et al. | 370/62 |
| 4,575,845 | 3/1986 | Baranyai et al. | 370/62 |

FOREIGN PATENT DOCUMENTS

| 57-55264 | 4/1982 | Japan . |
|---|---|---|
| 57-154956 | 9/1982 | Japan . |
| 58-75350 | 5/1983 | Japan . |

Primary Examiner—Douglas W. Olms
Assistant Examiner—Frank M. Scutch, III
Attorney, Agent, or Firm—Kinney & Lange

[57] ABSTRACT

A circuit for conference telephony using a conventional system for transmission of voice data and having no use for the conventional hybrid station is materialized by this invention using at least two buffer memory circuits provided for each of the frames and adapted to be switched to each other one for input and the other for output, enabling one of the buffer memory circuits to memorize voice data transmitted thereto and, in the meantime, permitting the voice data of the preceding frame memorized in the other buffer memory circuit to be read out, converting the voice data so read out to be converted into analog signals, and synthesizing the analog signals one another.

7 Claims, 9 Drawing Figures

| FIG. 3A | FIG. 3B |

CIRCUIT FOR CONFERENCE TELEPHONY

BACKGROUND OF THE INVENTION

1. Field of the Invention

This invention relates to a circuit for conference telephony. Particularly, this invention relates to a circuit for conference telephony which, in the digital signal transmission system having serial data transmitted and received by the use of packets, permits synthesis of voices.

2. Description of the Prior Art

In recent years, the development of local area networks (LAN) of the class represented by ETHERNET (Japanese Patent Publication SHO No. 57(1982)- 55264) has come to gather momentum. The LAN adopts a system wherein the digital signals transmitted on a communication cable are located within frames which are major enclosures periodically repeated on a time axis and a plurality of stations occupy regions on the time-sharing basis within the frames.

A type of conference telephony using the local area network is designed to be operated by a hybrid (hereinafter abbreviated as "HYB") device.

Figures 1A, 1B, 1C:
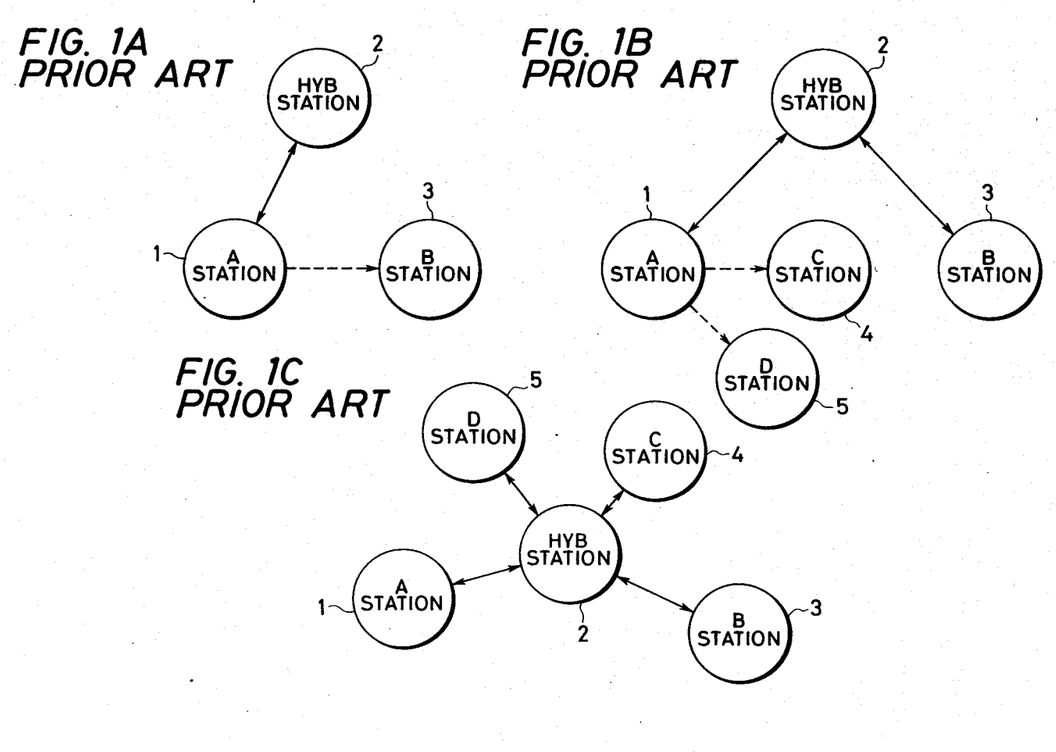
FIG. 1A, FIG. 1B and FIG. 1C are explanatory diagrams illustrating a typical conventional system for conference telephony.

In the conventional conference telephony, an A station 1 which convenes a conference first establishes a call with a HYB station 2 and then calls up a B station 3 as shown in FIG. 1A. Then, the B station 2 establishes a call with the HYB station 2. Subsequently, as shown in FIG. 1 (b), the A station 1 calls up a C station 4, a D station 5, . . . sequentially and the C station 4, the D station 5, . . . so called up sequentially establish a call with the HYB station 2.

Consequently, calls are established as radially connected between the HYB station 2 at the center and the individual stations as shown in FIG. 1C. The HYB station 2 synthesizes the voice packets from the stations and sends the product of synthesis back to the stations.

The conference telephony has been heretofore materialized by a procedure generally of the foregoing description.

The conventional system of this nature, however, has the disadvantage that it requires a HYB station furnished with a HYB apparatus adequate for the number of members taking part in the conference and, when the number of members is limited, the system cannot be fully utilized and proves costly. This system also has the possibility that a trouble in the HYB station will induce general disruption of the services of all the stations.

SUMMARY OF THE INVENTION

This invention has been accomplished for the purpose of relieving the conventional system of the disadvantage described above. An object of this invention is to provide a circuit for conference telephony which permits a conference among a small number of members to be realized at low cost and precludes the possibility of accidents inducing general disruption of all the services of the stations of conference telephony.

To attain the object described above, this invention is characterized by comprising a conventional voice data transmission system, at least two identical buffer memory circuits provided for each of the frames in the transmission system and adapted to be switched to each other one for input and the other for output, means for converting digital signals issued from the buffer memory circuits into analog voice signals, and an adder for synthesizing voice signals of one own station and the other stations.

DESCRIPTION OF THE DRAWINGS

FIG. 3 (FIGS. 3A, 3B) is a block diagram of a circuit for conference telephony in one embodiment of the present invention.

DETAILED DESCRIPTION OF THE INVENTION

Now, the present invention will be described in detail below with reference to the accompanying drawings.

Figure 2:
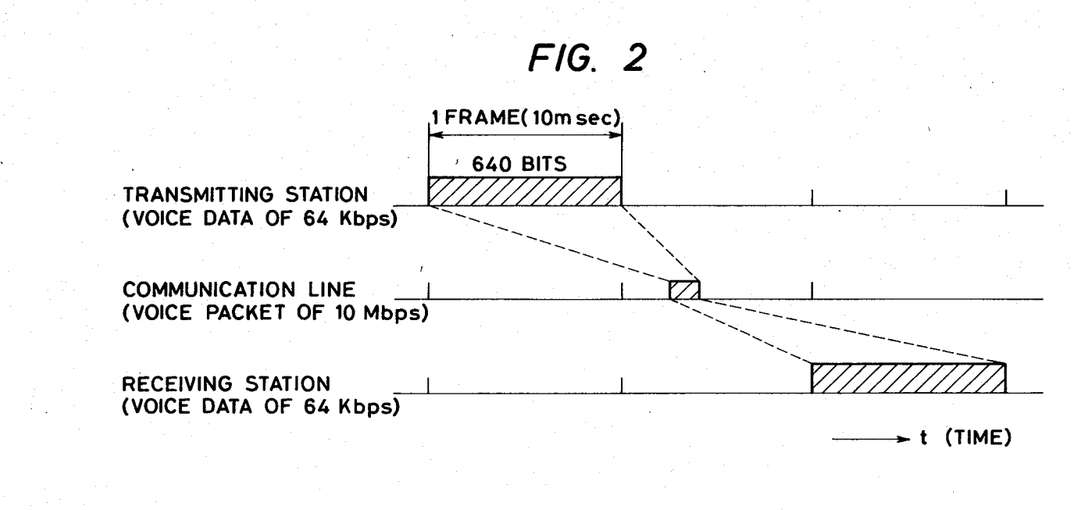
FIG. 2 is an explanatory diagram of voice data transmission speed of a voice transmission system used in one embodiment of the present invention.

Now, a typical system to be used for transmission of voices in the embodiment of this invention will be explained. A transmitting station encodes voices by the use of a PCM of 64 Kbps with frame periods of 10 m.sec. as illustrated in FIG. 2. Then, a communication line transmits voice packets comprising the encoded voice data as compressed at a speed of 10 Mbps as illustrated in FIG. 2. A receiving station, on reception of the voice data transmitted by the aforementioned communication line, expands the voice data into packets having a data length of 640 bits per frame. In this manner, voice data of the PCM of 64 Kbps can be transmitted by means of a local network.

Now, one embodiment of the present invention will be described in detail below with reference to FIG. 3.

Figures 3, 3A:
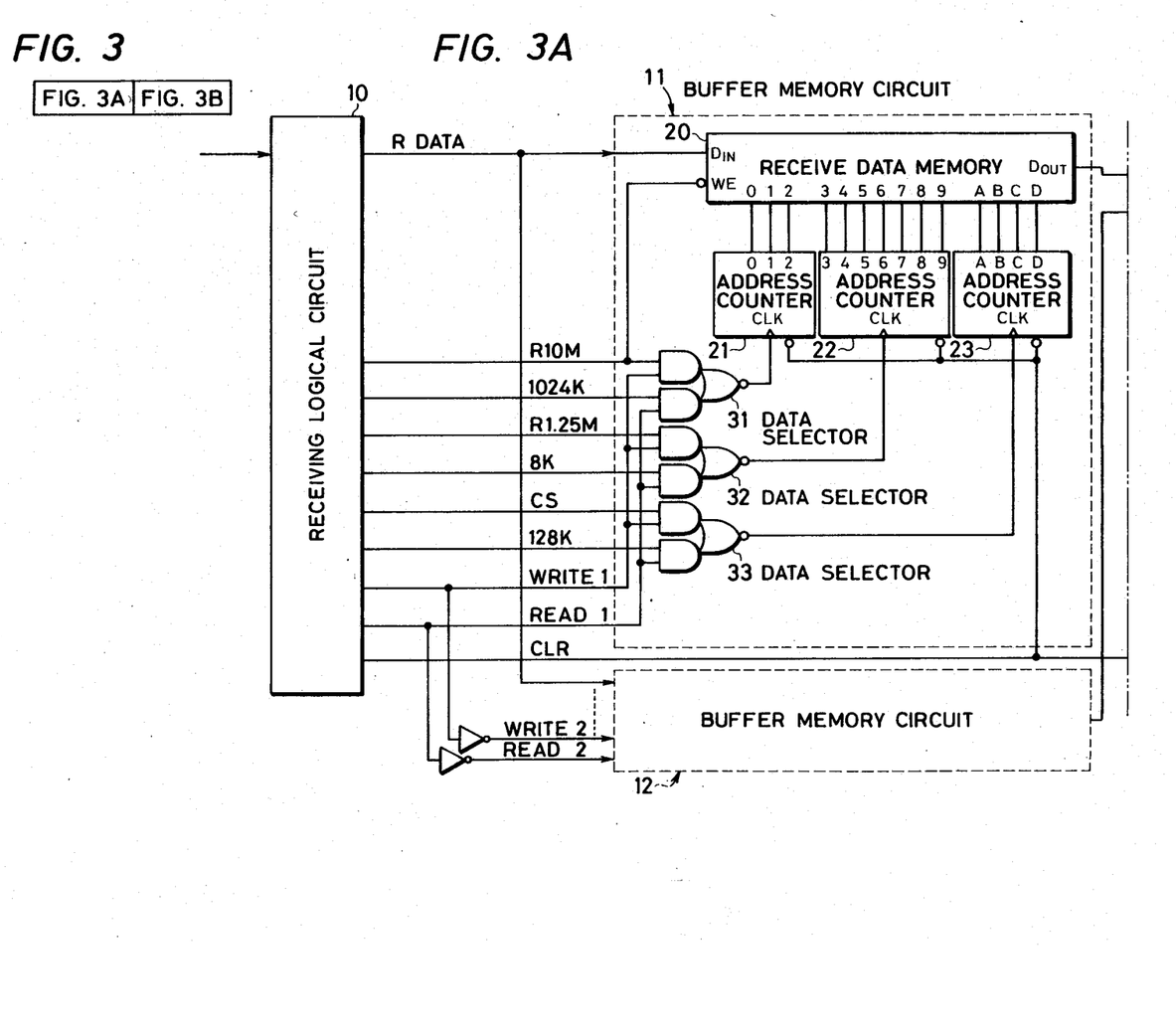

FIG. 3 (FIGS. 3A and 3B) is a block diagram of this embodiment of the present invention.

In the diagram, 10 denotes a receiving logical circuit which discriminate the transmitted voice packets as those for conference and, at the same time, feeds out clocks of 10 MHz (R10M) synchronized with both the individual bits and phases of the received packets and clocks of 1.25 MHz (R1.25M) produced by dividing the aforementioned clocks into one eighth of its frequency. It also feeds out clocks of 1,024 KHz, 8 KHz, and 128 KHz. It further generates carrier sense signals (CS signals) indicating reception of voice packets for conference from the other stations and, at the same time, feeds out write and read control signals and clear signals for clearing the various counters with frame periods as described more fully afterward.

Denoted by 11 and 12 are buffer memory circuits. The buffer memory circuit 11 is formed of a receiving data memory 20, address counters 21–23, and data selectors 31–33 for switching the operating clocks of the address counters 21–23 at the time data are written into and read out of the receiving data memory 20. The buffer memory circuit 12 has the same configuration as the buffer memory circuit 11 and, therefore, the detailed circuit configuration thereof is omitted from FIG. 3A. The reason for the provision herein of the two buffer memory circuits of an identical configuration, 11 and 12, is that they are enabled to write and read data alternately.

Figure 3B:
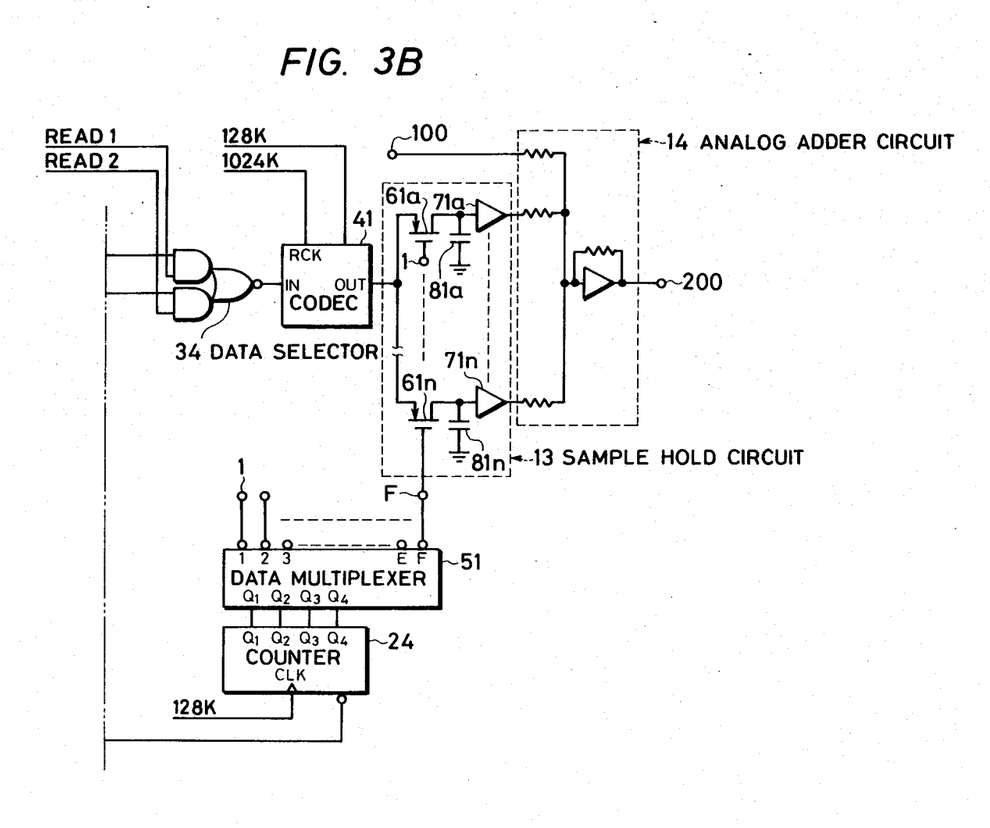

The data alternately read out of the buffer memory circuit 11 and the buffer memory circuit 12 are led to a data selector 34 and subsequently sent to a codec 41 through the data selector 34. The codec 41 is a well-known circuit formed of IC's. It is operated with signal inlet clocks of 1,024 KHz and D/A conversion clocks of 128 KHz brought in from the aforementioned receiving logical circuit 10 to convert the incoming 8-bit data into analog signals.

The output signals of the codec 41 are fed into a sample hold circuit 13. The sample hold circuit 13 is formed of sixteen analog switches $61a-61n$ and voltage holding capacitors $81a-81n$ and buffer amplifiers $71a-71n$ connected respectively to the analog switches $61a-61n$. The output signals from the aforementioned codec 41 are first distributed to the analog switches $61a-61n$ in the aforementioned sampling hold circuit 13 which are controlled by control signals issued from a data multiplexer 51. The analog switches $61a-61n$ are sequentially turned on one by one by the control signal issued from the data multiplexer 51. The signals which have passed through the aforementioned analog switches $61a-61n$ are retained in the voltage holding capacitors $81a-81n$ connected to the analog switches $61a-61n$.

The signals so retained in the voltage holding capacitors $81a-81n$ are amplified by the corresponding buffer amplifiers $71a-71n$ and fed in an analog adder 14. Further, the voices of the own station fed in from an own station's voice input terminal 100 are injected into the analog adder 14. The voice signals resulting from the addition in the analog adder 14 are taken out of an added voice output terminal 200.

A counter 24 accepts as its input the clocks of 128 KHz brought in from the aforementioned receiving logical circuit 10 and is cleared with periods of one frame or 10 m.sec. The aforementioned data multiplexer 51 has the output signals $Q_1-Q_4$ of the counter 24 as its input.

Now, the operation of the present embodiment of this invention will be described below.

The members participating in a conference send out conference voice packets (hereinafter referred to as "R data") from transmitting stations (not shown) onto the communication line. The conference voice packet is attained by adding to an address field or a control field an information serving to indicate that the contents of the packet are meant for the conference.

When the data brought in on the packets are discriminated by the receiving logical circuit 10 to be those for the conference, the R data are forwarded to the receiving data memory 20.

While the R data received by the buffer memory circuit 11 are being written in the receiving data memory 20 and the buffer memory circuit 12 is reading out the R data of the preceding frame, the write signals to be fed in the buffer memory circuit 11 are ranked to a high level and the read signals to a low level. Consequently, the aforementioned clocks of 10 MHz (R10M) are selected by the data selector 31 and fed in the address counter 21. Separately, the aforementioned clocks of 1.25 MHz (R 1.25M) are selected by the data selector 32 and fed in the address counter 22. Further, the aforementioned CS signals are selected by the data selector 33 and fed in the address counter 23. Since the address counter 23 has its contents counted up by the CS signals, it is counted up each time the packet is received.

The aforementioned address counter 21 counts the aforementioned clocks (R 10M) of 10 MHz, produces motions with periods of $8/10^7$ second, and feeds out the addresses of 000 to 111 to the receiving data memory 20. The aforementioned address counter 22 counts the aforementioned clocks of 1.25 MHz (R 1.25M), namely the clocks fed in at intervals of $8/10^7$ sec. and produces motions which are reset after each total of 80 counts of the aforementioned clocks.

Into the receiving data memory 20 of the present embodiment, therefore, the data of a density of 640 bits per packet transmitted through the communication line at a speed of 10 Mbps are written. Further, since the address counter 23 is counted up for each receiving packet as described above, the voice data transmitted from the maximum of 16 stations can be written in the receiving data memory 20 of the buffer memory circuit 11.

When all of the receiving data have finished to write in the receiving data memory 20, the same procedure as described above proceeds in the buffer memory circuit 12.

The amount of voice data which can be written in the receiving data memories of the buffer memory circuits 11, 12 is limited by the memory capacity. Accordingly, voice data transmitted from more than 16 stations can be stored if receiving data memories of a larger memory capacity are adopted as the receiving data memories 20.

The aforementioned address counters 21, 22, 23 are cleared with frame periods, i.e. periods of 10 m.sec. In other words, they are cleared each time all 16 or less transmitting stations severally have completed transmission of one packet of voice data.

Then, when data are to be read out of the receiving data memory 20 of the buffer memory circuit 11, the read signals to be fed in the buffer memory circuit 11 are raised to a high level and the write signals lowered to a low level. Conversely, the read signals to be fed in the buffer memory circuit 12 are lowered to a low level and the write signals raised to a high level.

As the result, the data selector 31 selects clocks of 1,024 KHz and the selected clocks are fed into the address counter 21. The data selector 32 selects clocks of 8 KHz. The selected clocks are fed into the address counter 22. Further, the data selector 33 selects clocks of 128 KHz. The selected clocks are fed into the address counter 23.

Since the receiving data memory 20 has address designation effected based on the outputs of the aforementioned address counters 21, 22, 23, voice data of a total of 16 channels at a rate of eight bits per channel are serially and cyclicly read out with periods of 125 $\mu$.sec (8 KHz).

While the reading of data from the buffer memory circuit 11 is proceeding, the voice data in the next packets from the transmitting stations are memorized in the receiving data memory of the buffer memory circuit 12.

The data read out of the receiving data memory 20 are passed through the data selector 34 and fed in the codec 41. The codec 41 is operated with the signal inlet clocks of 1,024 KHz and the D/A conversion clocks of 128 KHz to effect sequential conversion into voice voltages the data transmitted at the rate of 8 bits per channel.

Figure 4:
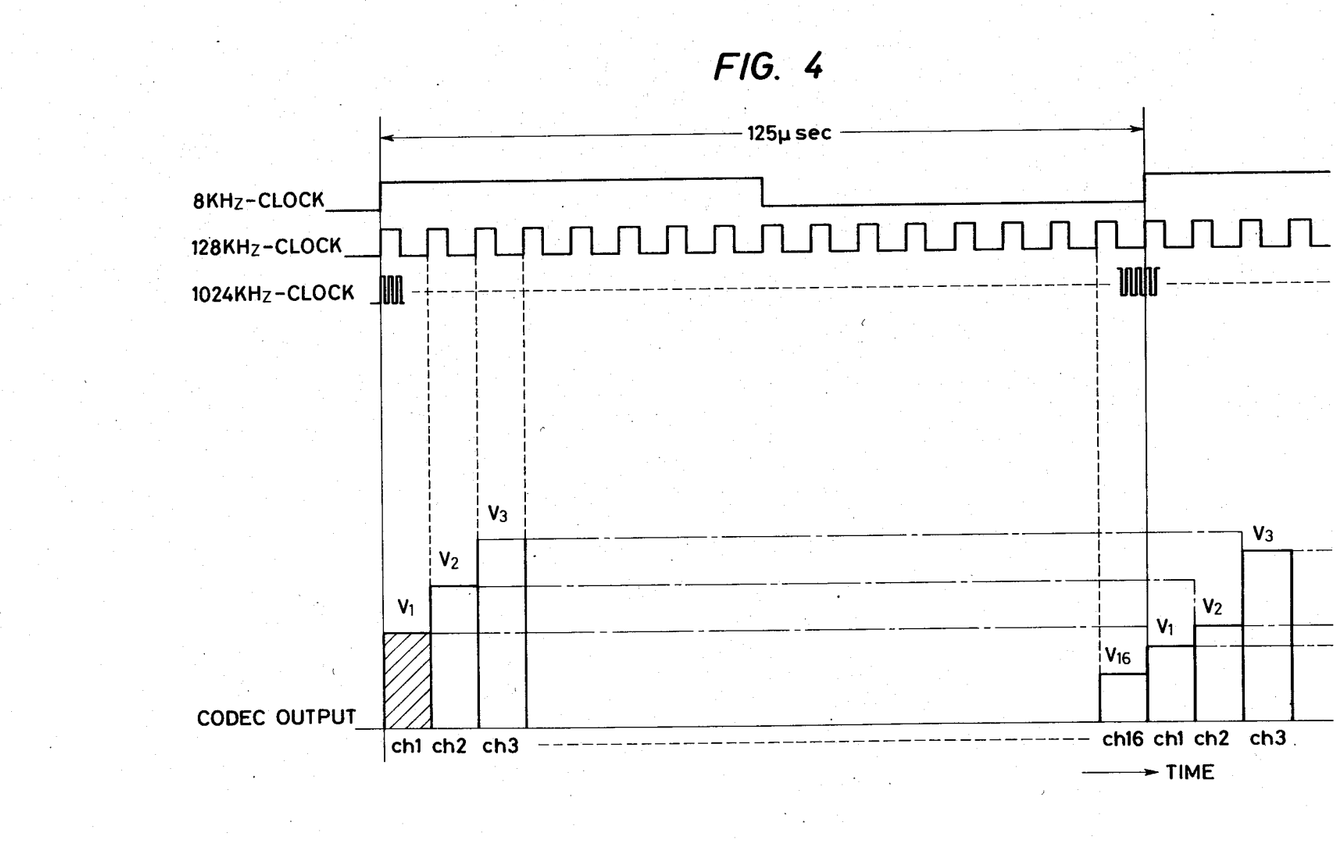
FIG. 4 is an explanatory diagram of the operation of a codec in the circuit of FIG. 3B.

FIG. 4 is an explanatory diagram illustrating the operation of the codec 41.

As illustrated in FIG. 4, the data of 16 channels in the receiving data memory 20 are read out cyclicly at a rate of 8 bits per channel and its cycle is 125 $\mu$.sec. The clocks of 128 KHz show the clocks fed in the codec 41 for the D/A conversion. The codec 41 converts the data received at a rate of 8 bits per channel with the clocks of 1,024 KHz indicated in FIG. 4 into analog amounts with the clocks of 128 KHz. An example of the codec output so converted in the analog amounts is represented in FIG. 4.

The 8-bit data corresponding to ch 1, for example, are converted by the codec 41 into an output $V_1$. Similarly, the 8-bit data corresponding to the other channels are converted by the codec 41 into the outputs $V_2$–$V_{16}$ in twin. These outputs $V_1$–$V_{16}$ are derived from the codec 41 with periods of 125 $\mu$.sec (8 KHz).

Now, the following description will be given again with reference to FIG. 3. The counter 24 produces a motion to divide clocks of 128 KHz into one sixteenth of its frequency to feed out $Q_1$–$Q_4$ (0000-1111). A 4 to 16 multiplexer 51 changes corresponding one of the outputs, 1-F, active depending on the inputs of $Q_1$–$Q_4$. As the result, the analog switches 61a–61n which correspond to 16 channels are sequentially turned on, with the result that the output voltages $V_1$–$V_{16}$ of the codec 41 for each channel are accumulated in the voltage holding capacitors 81a–81n respectively.

The electric charges accumulated in the voltage holding capacitors 81a–81n are forwarded through buffer amplifiers 71a–71n and fed in the analog adder 14, there to effect addition of voice data from the channels. The sound data so obtained are taken out of the added voice output terminal 200. The own station's voice input terminal 100 admits the voice signal from the own station.

In accordance with the present embodiment, the conference telephony can be carried out with the maximum of 16 channels as described above.

The embodiment given above has permitted conference telephony to be carried out among a total of 16 channels. Optionally in this embodiment, the number of channels to participate in the conference telephony can be decreased to eight by reducing the read clock frequencies, 128 KHz and 1,024 KHz, to their respective halves. By the same token, the number of channels for the conference telephony can be easily doubled by increasing the memory capacity to twice the capacity involved above and also effecting twofold increase of the read clock frequencies, 128 KHz and 1,024 KHz.

Figure 5:
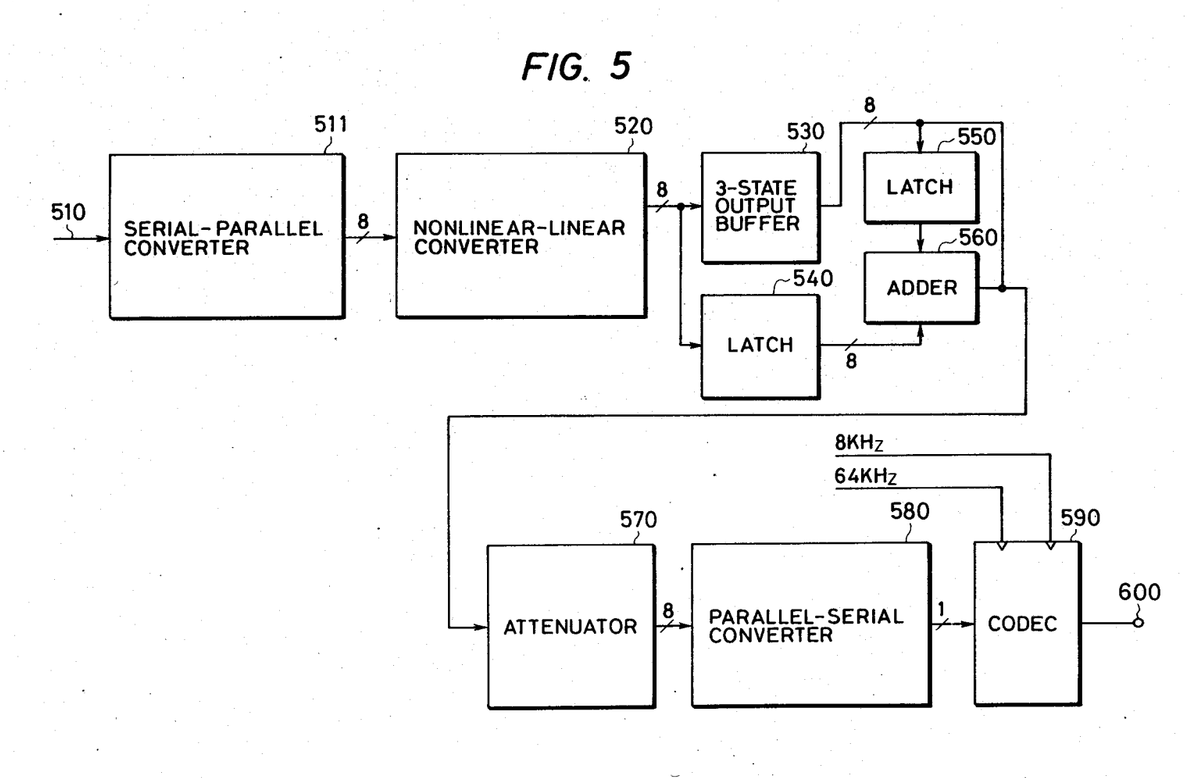
FIG. 5 is a block diagram of another embodiment of this invention which adopts digital voice synthesis.

In another embodiment of the present invention, the sample hold circuit 13 and the analog adder 14 mentioned above (FIG. 3B) can be substituted with a synthesizing circuit formed of a digital circuit as illustrated in FIG. 5. In the construction of this embodiment, the circuit preceding the data selector 34 is the same as that used in the first embodiment.

The operation of the second embodiment illustrated in FIG. 5 is as follows. The data 510 issued by the data selector 34 of FIG. 3B are converted by a serial parallel converter 511 into parallel data and transformed by a nonlinear-linear conversion circuit 520 (realized as with ROM) into a linear output. The output data corresponding to the first channel are passed through a three-state output buffer 530 and are latched by an 8-bit latch 550.

The output data corresponding to the second channel are latched by an 8-bit latch 540. The data corresponding to the channel 1 and those corresponding to the channel 2 are added in an adder 560. The result of the addition is latched by the latch 550.

The data corresponding to the third and following channels are sequentially ratched by the latch 540. In the adder 560, addition of the data ratched by the latch 540 and those latched by the aforementioned latch 550 are repeated. The additions of the data from the first through 16th channels are carried out with periods of 125 $\mu$.sec (8 KHz). The outcomes of the additions are compressed by an attenuator 570 to 1/16 of the value of the additions. The data so obtained are further converted by a parallel-serial converter 580 into serial data and fed into a codec 590. The codec 590, similarly to the countertype used in the first embodiment, converts the 8-bit data introduced with the clocks of 64 KHz into analog signals by the use of clocks of 8 KHz. The output signals of the codec 590 are fed out of an output terminal 600.

As is plain from the foregoing description, this invention attains the following effects.

(1) This invention contemplates furnishing all the stations involved each with a circuit for conference telephony and obviates the necessity for using a HYB station provided with as many HYB devices as member stations participating in conference telephony as involved in the conventional system. Thus, it eliminates the possibility that a trouble in the HYB station will induce total disruption of the services of conference telephony. Since the HYB function is apportioned to all the stations, the possibility that general interruption of the services of the stations will be caused by an accident can be minimized.

(2) The system of the present invention can be wholly and fully utilized without reference to the size of membership for conference telephony and, therefore, operates with high efficiency. Particularly, when the system is meant for conference telephony involving a small number of member stations, it proves far less expensive than the conventional system of a comparable capacity.

(3) This invention permits the receiving data memory space to be freely allocated to the individual stations (members of conference telephony) and the codec to be effectively used on the time sharing basis. Thus, the circuit for conference telephony can be providing codecs one each for all the receiving stations. Again in this respect, the system of the present invention proves less expensive.

What is claimed is:

1. A circuit for conference telephony by the use of a multiple-station communication network wherein digital signals representative of voice data of a conference are transmitted on communication cables and are located within frames which are periodically repeated on a time axis and a plurality of stations are allowed to transmit signals which occupy regions within the frames on a time sharing basis to effect transmission of digital signals, the circuit characterized by receiving logical circuit means for determining whether received voice data is for the conference and for providing timing control signals, at least two buffer memory circuits of identical configuration for reading and writing each of said frames of voice data transmitted from member stations of conference telephony alternately, each buffer memory circuit including receive data memory coupled to the receiving logical circuit means for memorizing the voice data transmitted from the member stations in the order of transmission through the communication cables and at a rate synchronized with transmission speed of the voice data during writing, and means coupled to the receiving logical circuit means for causing the voice data to be read out of the receive data memory repeatedly in fixed amounts during reading, the circuit also characterized by means coupled to the receiving logical circuit means for alternately causing reading and writing by the buffer memory circuits for each frame of voice data, means for D/A converting, on a time sharing basis, said voice data from said member stations of conference telephony read out of said buffer memory circuits, and means for adding said voice data.

2. A circuit according to claim 1, and including first address counter means for counting a first clock of timing synchronized with both the individual bits and phases of said voice data for conference telphony for determining addresses in said receive data memory during the course of writing, second address counter means for counting a second clock possessing a period which is a multiple of the period of said first clock, and third address counter means for counting carrier sense signals (CS signal).

3. A circuit according to claim 2 wherein the receiving logical circuit means includes means for generating first, second, and third read clocks as timing control signals for application to the first, second, and third address counters, respectively, and for causing the address counters to determine addresses in said receive data memory during the course of reading.

4. A circuit according to claim 3 wherein said buffer memory circuits each include data selector means responsive to the receiving logical circuit means for switching the clocks applied to said first, second, and third counters.

5. A circuit according to claim 1, wherein said means for D/A converting the voice data read out of said buffer memory circuits on a time sharing basis comprises one codec.

6. A circuit according to claim 5 wherein said means for adding said voice data comprises a sample holding circuit for retaining analog voltages of an output of said codec, and an analog adder.

7. A circuit according to claim 6 wherein said means for adding said voice data includes a nonlinear-linear conversion circuit for converting the output of said buffer memory circuits into a linear output, a digital adder and, means adapted to introduce an output of said adder into the codec.

* * * * *